United States Patent [19]

Titus et al.

[11] 3,761,742

[45] Sept. 25, 1973

[54] HIGH-FREQUENCY CHOPPER SUPPLY

[75] Inventors: Robert J. Titus; William J. Kelly, both of Sauquoit, N.Y.

[73] Assignee: Cogar Corporation, Utica, N.Y.

[22] Filed: Oct. 1, 1971

[21] Appl. No.: 185,703

[52] U.S. Cl. 307/240, 307/254
[51] Int. Cl. H03k 17/00
[58] Field of Search 307/240, 254, 237, 307/255; 330/15

[56] References Cited

UNITED STATES PATENTS

| | | | |
|---|---|---|---|
| 2,931,986 | 4/1960 | Ensink et al. | 330/15 |
| 3,160,766 | 12/1964 | Reymond | 307/255 |
| 3,600,696 | 8/1971 | Grandmont | 330/15 |
| 3,490,027 | 1/1970 | Galetto et al. | 330/15 X |
| 2,914,683 | 11/1969 | Terry | 307/237 X |

*Primary Examiner*—John W. Huckert
*Assistant Examiner*—B. P. Davis
*Attorney*—Harry M. Weiss et al.

[57] ABSTRACT

A chopper supply in which two transistors are alternately switched on and off to control opposite-polarity currents to flow through the primary winding of a transformer. The emitters of the two transistors are connected together and an inductor is included in the emitter circuits. The inductor functions to delay the turning on of each transistor until the other has fully turned off.

6 Claims, 2 Drawing Figures

PATENTED SEP 25 1973 3,761,742

INVENTORS
ROBERT J. TITUS
WILLIAM J. KELLY
BY Gottlieb, Rackman & Reisman
Harry M Weiss
ATTORNEYS

HIGH-FREQUENCY CHOPPER SUPPLY

This invention relates to copper supplies, and more particularly to chopper supplies which can be operated at high switching frequencies.

In a typical shopper supply, two switching transistors are connected in series with respective primary windings of a transformer and the transistors are made to conduct alternately so that the flux in the transformer changes direction at the rate at which the transistors are switched. The output voltage across a secondary winding is a square wave whose amplitude is dependent upon the turns ratio of the transformer, and after rectification there results a DC voltage whose amplitude is proportional to the product of the amplitude of the voltage swings cross the primary windings of the transformer and the turns ratio. In many cases, several secondary windings are included on the transformer core in order to derive several different magnitude DC voltages. Chopper supplies of this type are well known in the art; they are often referred to as "converters."

It is also well known that as the switching frequency increases, a smaller transformer can be used since the size of the transformer core is roughly proportional to the ratio of the power delivered by the transformer to the switching frequency. It is also known, however, that as the switching frequency increases the efficiency of the chopper supply decreases; furthermore, the current surges which result may be so large in magnitude that the life of the switching transistors may be shortened considerably.

It is a general object of our invention to provide a chopper supply in which the switching frequency can be relatively high without resulting in a serious drop in efficiency or excessively large current surges.

It has been found that the decrease in efficiency and the large current surges which have posed a problem in the prior art are due to the fact that there is an inherent delay before a conducting transistor turns off. That is, whenever the off transistor is to turn on and the on transistor is to turn off, the off transistor turns on before the on transistor turns off. This necessarily results in simultaneous conduction of the two transistors for a short interval at the start of each half cycle. It is the simultaneous conduction of the two transistors, thereby producing opposing magnetomotive forces, that lowers the efficiency of the supply and also results in larger current surges.

In accordance with the principles of our invention, a circuit is provided for delaying the turning on of the previously off transistor until the previously on transistor has turned off. In a preferred embodiment of the invention, the turn-on delay consists simply of an inductor connected in the emitter circuit of each of the transistors. It is also advantageous to include a diode and a damping resistor, in parallel with the inductor.

It is a feature of our invention to provide a mechanism to prevent the turning on of a previously off transistor (switch) in a chopper until the previously on transistor has turned off.

It is another feature of our invention, in the illustrative embodiment thereof, to control the turn-on delay by including a parallel connection of an inductor, a diode and a resistor in the common emitter circuit of the transistors.

Further objects, features and advantages of the invention will become apparent upon consideration of the following detailed description in conjunction with the drawing, in which.

Figure 1:
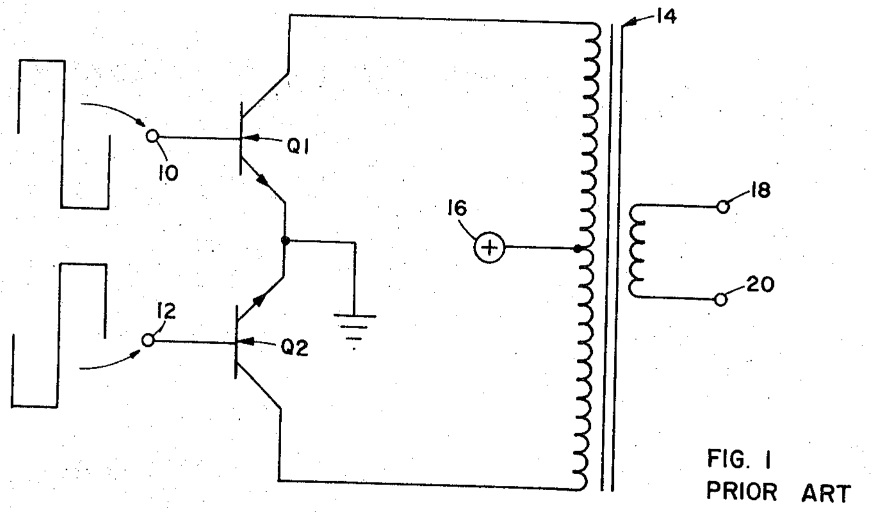
FIG. 1 PRIOR ART
FIG. 1 depicts a typical prior art chopper supply.

In the circuit of FIG. 1, transistors Q1 and Q2 are alternately switched on and off to convert the input DC voltage of source 16 to a square-wave signal across secondary terminals 18 and 20. Typically, the input DC voltage is derived from a 100-volt regulated source and the turns ratio of transformer 14 is such that the peak-to-peak amplitude of the voltage across the secondary winding is 10 volts. In a typical circuit, the square-wave signal would then be rectified and filtered in order to derive a regulated 5-volt DC source.

There are two well known techniques for controlling the alternate conduction of transistors Q1 and Q2. It is possible to use a self-oscillating circuit whose frequency is controlled by a small volt-second saturable transformer. Alternatively, it is possible to provide clock and logic circuit for alternately biasing on the two transistors. In FIG. 1, the alternate conduction of the transistors is shown by the opposite polarity square-wave signals applied to the bases of the two transistors, it being understood that the two signals can be derived in any conventional manner.

When the base of transistor Q1 is positive relative to its emitter such that the transistor is caused to saturate, current flows from 100-volt source 16 through the upper half of the primary winding and the transistor to ground. This causes a first polarity output voltage to be generated across the secondary winding. On the other hand, when transistor Q2 is driven into saturation, current flows from source 16 through the lower half of the primary winding and transistor Q2 to ground. At this time, an opposite polarity voltage is generated across terminals 18 and 20.

The drive signals to the bases of transistors Q1 and Q2 are symmetrical and out of phase with each other. Therefore, when the drive signal for transistor Q1 is rising to turn it on, the drive signal for transistor Q2 is falling to turn it off. When transistors are used as switches, usually they are driven into saturation with low collector-emitter drops in order to reduce the power dissipation in the transistors. When a transistor is driven into saturation, current flows from the base into the collector region. When the base-emitter junction of the transistor is reverse biased in order to turn it off, the transistor does not turn off until the store charge in the collector region recombines in the base region. The phenomenon is known as the "storage time" of the transistor and external circuits have very little effect on it, that is, it is very difficult to speed up the turn-off of the transistor with the use of external circuitry. When a transistor is used as a switch in the manner described, it takes much longer for the transistor to turn off then it does for the transistor to turn on.

Typically, each of transistors Q1 and Q2 can turn on in 200–300 nanoseconds while it requires from 1.5 to 2 microseconds for the transistor to turn off. With symmetrical but out-of-phase drive signals, it is apparent that in the case of a 200-nanosecond turn-on time and a 2-microsecond turn-off time both transistors will simultaneously conduct for 1.8 microseconds during each half cycle. If the switching rate is 20 kHz, each half-cycle is 25 microseconds in duration and it is apparent that both transistors conduct together for slightly more than 7 percent of the time that the chopper supply is in operation.

When both transistors conduct, opposing magnetomotive forces are applied to the primary winding of the transformer, the opposing fluxes in the transformer core cancel each other out and the transformer primary looks like a very low impedance. As a result, large currents flow through both halves of the primary winding and the transistors. If the normal current through one of the transistors is 3 amperes, the current surges can be as high as 13 amperes at their peaks. The current surges not only waste power as a result of increased dissipation in the transistors, but they tend to decrease the life of the transistors as well. In a ypical system, it was found that the input power was 340 watts and the output power was 200 watts, with the wasted power as a result of the current surges being 40 watts.

In the illustrative system of FIG. 1, the switching rate was 20 kHz. If the switching rate is increased, the problem is aggravated. An increase in the switching rate shortens each half cycle of operation without having any effect on the period of simultaneous conduction of the two transistors. Consequently, the percentage of time that the two transistors conduct together increases and results in a still further decrease in efficiency and a greater percentage of time when the transistors conduct excessive currents.

Figure 2:
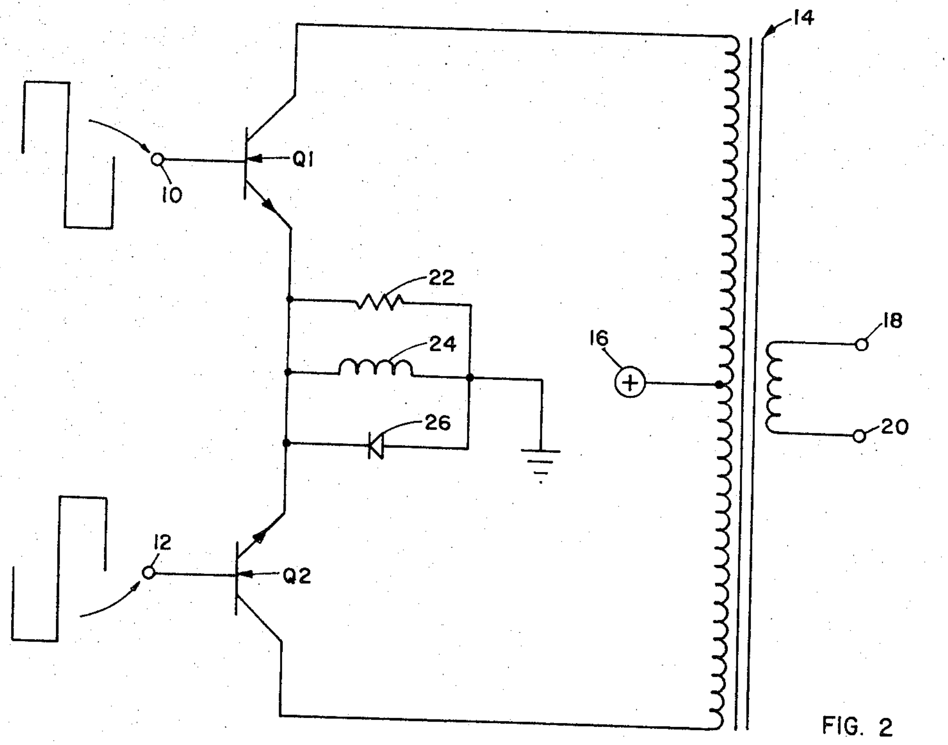
FIG. 2 depicts the illustrative embodiment of the invention.

In order to substantially eliminate the overlap in the conduction of the two transistors, inductor 24 is added to the prior art chopper supply as shown in FIG. 2. Toward the end of a half cycle during which transistor Q2 conducts, the current through the transistor flows through inductor 24 to ground. The inductor presents a negligible impedance to the current. If a turn-on signal is then applied to the base of transistor Q1 at the same time that a turn-off signal is applied to the base of transistor Q2, and transistor Q1 attempts to conuct, a small current from the emitter of transistor Q1 which flows through inductor 24 produces a large-magnitude step voltage across the inductor. The voltage across an inductor is proportional to the rate of change of the current through the inductor, and even a small step in the current from transistor Q1 results in a large voltage. Typically, if the drive signal at the base of transistor Q1 has a magntidue of 4 volts, the step voltage across inductor 24 is of the same order of magnitude. A positive voltage step thus appears at the emitter of transistor Q1 to hold the transistor substantially off. Thus transistor Q1 does not turn on (except for an almost negligible current flow) when a turn-on signal is applied to its base.

When transistor Q2 turns off after approximately 2 microseconds, the current which previously flowed through the transistor and inductor 24 decreases abruptly. This causes a negative voltage step to appear across the inductor. Diode 26 is provided to clamp the junction of the emitters and inductor 24 to ground insofar as negative excursions are concerned. As soon as the voltage at the junction drops to ground, transistor Q1 turns on immediately. Because the negative voltage induced across the inductor is caused by the turning off of transistor Q2, it is apparent that transistor Q1 turns on simultaneously with the turning off of transistor Q2.

Diode 26 is provided for the following reason. During the major portion of each half cycle that transistor Q2 conducts, a constant current flows through inductor 24 to ground. As soon as it is attempted to turn on transistor Q1, a small current flows from transistor Q1 through the inductor to ground, this small current increasing the voltage across the inductor so that conduction of transistor Q1 is limited to a low level. Thus, just before transistor Q2 turns off, the current through inductor 24 is equal to the sum of the large current which normally flows through an on transistor and the small current which flows through transistor Q1 during the first two microseconds of its conducting half cycle. As soon as transistor Q2 turns off and transistor Q1 turns fully on, the current which flows through the inductor should drop slighlty to the normal large-magnitude current which flows during the major portion of each half cycle and which should now flow through transistor Q1. In order to dissipate the excess current in inductor 24, the diode is provided. All of the current which flows through transistor Q1 flows through the inductor to ground. The excess current which initially flows through the inductor when transistor Q1 turns fully on simply flows in the forward direction through the diode and is quickly dissipated.

It is possible that stray capacitance across the diode and the inductor could result in a ringing current through the resultant resonant circuit. For this reason resistor 22 is provided; the resistor damps the current to prevent ringing. It is desirable to prevent the ringing in order that the base-emitter junctions of the transistors not be excessively forward biased.

Of course, while the functions of inductor 24, diode 26, and resistor 22 were described above in connection with the delay in the turning on of transistor Q1, it should be apparent that the same remarks apply to a delay in the turning on of transistor Q2. In both cases, the inductor functions to delay the turning on of the previously off transistor until the previously on transistor has turned off. With almost negligible overlap in the conduction of the transistors, it is possible to increase the switching rate (and thus decrease the size of the transformer) without lowering the efficiency of the chopper supply or reducing the effective life of the transistors.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A chopper supply comprising a pair of same conductivity type transistors each having emitter, base and collector terminals, a transformer having a secondary winding and two primary windings, means for connecting one end of each of said primary windings to the collector terminal of a respective one of said transistors, means for applying opposite-phase turn-on and turn-off signals to the base terminals of said transistors, DC voltage source means connected between the other end of each of said primary windings and the emitter terminal of each of said transistors, and means connected to the emitters of said pair of transistors for delaying the turning on of each of said transistors until the other of said transistors has turned off, said turn-on delaying means includes inductor means connected in and shared by the emitter circuits of said two transistors, said turn-on delaying means further includes diode means connected across said inductor means and poled in the direction opposite to the direction in which current flows in the emitter circuits of said transistors.

2. A chopper supply in accordance with claim 1 further including resistor means connected across said inductor means.

3. A chopper supply comprising a pair of same conductivity type switching means, a transformer having a secondary winding and two primary windings, means for connecting one end of each of said primary windings to a respective one of said switching means, each of said pair of switching means comprising a transistor having an emitter, base and collector, means for applying opposite turn-on and turn-off signals to said pair of switching means, DC voltage source means connected to the other end of each of said primary windings, and means connected to the emitters of said pair of transistors for delaying the turning on of each of said switching means until the other of said switching means has turned off, said turn-on delaying means includes inductor means connected to said pair of switching means, said turn-on delaying means further includes diode means connected across said inductor means and poled in the direction opposite to the direction in which current flows through said pair of switching means.

4. A chopper supply in accordance with claim 3 further including resistor means connected across said inductor means.

5. A chopper supply comprising a pair of same conductivity type switching means, each of said pair of switching means comprising a transistor having an emitter, base and collector, transformer means having primary and secondary winding means, means for enabling said pair of switching means to conduct alternately, means connecting said pair of switching means to said primary winding means for causing opposite polarity signals to be induced in said secondary winding means responsive to the alternate conduction of said pair of switching means, and means connected to the emitters of said pair of transistors responsive to the turning off of each of said switching means for controlling the simultaneous turning on of the other, enabled switching means, said turning on controlling means includes inductor means connected in common to said pair of switching means, said turning on controlling means further includes diode means connected across said inductor means and poled in the direction opposite to the direction in which current flows through said pair of switching means.

6. A chopper supply in accordance with claim 5 further including resistor means connected across said inductor means.

* * * * *